US009775376B2

(12) United States Patent
Cantrell et al.

(10) Patent No.: US 9,775,376 B2
(45) Date of Patent: Oct. 3, 2017

(54) SMOKELESS TOBACCO PASTILLE AND MOULDING PROCESS FOR FORMING SMOKELESS TOBACCO PRODUCTS

(75) Inventors: Daniel Verdin Cantrell, Lewisville, NC (US); Joshua D. Morton, Evansville, IN (US); Steven D. Hume, Owensboro, KY (US); Barry Bratcher, Owensboro, KY (US); Robert Frank Boutin, Hinsdale, IL (US); Thomas Hinkemeyer, Gages Lake, IL (US); Thaddeus J. Jackson, High Point, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 1747 days.

(21) Appl. No.: 12/957,821

(22) Filed: Dec. 1, 2010

(65) Prior Publication Data

US 2012/0138074 A1    Jun. 7, 2012

(51) Int. Cl.
| A24B 15/30 | (2006.01) |
| A24B 15/12 | (2006.01) |
| A23G 3/48  | (2006.01) |
| A24B 13/00 | (2006.01) |

(52) U.S. Cl.
CPC ............ *A24B 15/12* (2013.01); *A23G 3/48* (2013.01); *A24B 13/00* (2013.01); *A24B 15/30* (2013.01)

(58) Field of Classification Search
None
See application file for complete search history.

(56) References Cited

U.S. PATENT DOCUMENTS

| 1,376,586 A | 5/1921 | Schwartz |
| 3,098,492 A | 7/1963 | Wurzburg et al. |
| 3,386,449 A * | 6/1968 | Hind .............. A24B 15/12 131/370 |
| 3,696,917 A | 10/1972 | Levi |
| 3,806,617 A | 4/1974 | Smylie |
| 4,144,895 A | 3/1979 | Fiore |
| 4,148,325 A | 4/1979 | Solomon et al. |
| 4,150,677 A | 4/1979 | Osborne, Jr. et al. |
| 4,206,092 A | 6/1980 | Sprecker et al. |
| 4,267,847 A | 5/1981 | Reid |
| 4,289,147 A | 9/1981 | Wildman et al. |
| 4,317,837 A * | 3/1982 | Kehoe ................. A23G 4/06 131/354 |
| 4,351,346 A | 9/1982 | Brummer et al. |
| 4,359,059 A | 11/1982 | Brummer et al. |
| 4,506,682 A | 3/1985 | Muller |
| 4,513,756 A | 4/1985 | Pittman et al. |
| 4,528,993 A | 7/1985 | Sensabaugh, Jr. et al. |
| 4,589,428 A | 5/1986 | Keritsis |
| 4,605,016 A | 8/1986 | Soga et al. |
| 4,624,269 A | 11/1986 | Story et al. |
| 4,660,577 A | 4/1987 | Sensabaugh et al. |
| 4,716,911 A | 1/1988 | Poulose et al. |
| 4,725,440 A | 2/1988 | Ridgway et al. |
| 4,727,889 A | 3/1988 | Niven, Jr. et al. |
| 4,874,000 A | 10/1989 | Tamol et al. |
| 4,880,018 A | 11/1989 | Graves, Jr. et al. |
| 4,887,618 A | 12/1989 | Bernasek et al. |
| 4,941,484 A | 7/1990 | Clapp et al. |
| 4,967,771 A | 11/1990 | Fagg et al. |
| 4,986,286 A | 1/1991 | Roberts et al. |
| 4,987,907 A | 1/1991 | Townend |
| 4,989,620 A | 2/1991 | Keritsis et al. |
| 4,991,599 A | 2/1991 | Tibbetts |
| 5,005,593 A | 4/1991 | Fagg |
| 5,018,540 A | 5/1991 | Grubbs et al. |
| 5,060,669 A | 10/1991 | White et al. |
| 5,065,775 A | 11/1991 | Fagg |
| 5,072,744 A | 12/1991 | Luke et al. |
| 5,074,319 A | 12/1991 | White et al. |
| 5,092,352 A | 3/1992 | Sprinkle, III et al. |
| 5,099,862 A | 3/1992 | White et al. |

(Continued)

FOREIGN PATENT DOCUMENTS

| WO | WO 91/06288 | 5/1991 |
| WO | WO 2004/095959 | 11/2004 |

(Continued)

OTHER PUBLICATIONS

IARC Monographs, vol. 89, p. 154. Date 2007.*
Danebower, et al. "Tobacco as a Biochemical Resource: Past, Present, and Future" Biologically Active Natural Products: Agrochemicals, pp. 155-168.
De Roton et al. "Factors Influencing the Formation of Tobacco-Specific Nitrosamines in French Air-Cured Tobacco in Trials and at the Farm Level", Beitrage zur Tabakforschung International/Contributions to Tobacco Research, Jul. 2005, pp. 305-320, vol. 21 No. 6.

(Continued)

*Primary Examiner* — Michael H Wilson
*Assistant Examiner* — Phu Nguyen
(74) *Attorney, Agent, or Firm* — Womble Carlyle Sandridge & Rice, LLP

(57) ABSTRACT

A smokeless tobacco composition configured for insertion into the mouth of a user is provided. The smokeless tobacco composition includes a tobacco material, a sugar alcohol, and a natural gum binder component, wherein the composition is in the form of a pastille. A process for preparing a smokeless tobacco composition pastille configured for insertion into the mouth of a user is also provided. The process includes providing an aqueous mixture comprising a hydrated natural gum binder component, mixing a tobacco material with the aqueous mixture to form a smokeless tobacco mixture, heating the smokeless tobacco mixture, depositing the heated smokeless tobacco mixture into a mold, and curing the smokeless tobacco mixture to form a smokeless tobacco composition pastille.

14 Claims, No Drawings

(56) References Cited

U.S. PATENT DOCUMENTS

| | | | |
|---|---|---|---|
| 5,121,757 A | 6/1992 | White et al. | |
| 5,131,414 A | 7/1992 | Fagg et al. | |
| 5,131,415 A | 7/1992 | Munoz et al. | |
| 5,148,819 A | 9/1992 | Fagg | |
| 5,183,062 A * | 2/1993 | Clearman et al. | 131/194 |
| 5,197,494 A | 3/1993 | Kramer | |
| 5,230,354 A | 7/1993 | Smith et al. | |
| 5,234,008 A | 8/1993 | Fagg | |
| 5,243,999 A | 9/1993 | Smith | |
| 5,301,694 A | 4/1994 | Raymond et al. | |
| 5,318,050 A | 6/1994 | Gonzalez-Parra et al. | |
| 5,343,879 A | 9/1994 | Teague | |
| 5,360,022 A | 11/1994 | Newton et al. | |
| 5,387,416 A | 2/1995 | White et al. | |
| 5,435,325 A | 7/1995 | Clapp et al. | |
| 5,445,169 A | 8/1995 | Brinkley et al. | |
| 5,525,351 A * | 6/1996 | Dam | A23G 3/36 424/434 |
| 5,539,093 A | 7/1996 | Fitzmaurice et al. | |
| 5,668,295 A | 9/1997 | Wahab et al. | |
| 5,705,624 A | 1/1998 | Fitzmaurice et al. | |
| 5,829,453 A | 11/1998 | White et al. | |
| 5,844,119 A | 12/1998 | Weigl | |
| 6,077,524 A | 6/2000 | Bolder et al. | |
| 6,131,584 A | 10/2000 | Lauterbach | |
| 6,182,670 B1 | 2/2001 | White et al. | |
| 6,284,875 B1 | 9/2001 | Turpen et al. | |
| 6,298,859 B1 | 10/2001 | Kierulff et al. | |
| 6,510,855 B1 | 1/2003 | Korte et al. | |
| 6,668,839 B2 | 12/2003 | Williams | |
| 6,730,832 B1 | 5/2004 | Dominguez et al. | |
| 6,772,767 B2 | 8/2004 | Mua et al. | |
| 6,817,970 B2 | 11/2004 | Berit et al. | |
| 6,834,654 B2 | 12/2004 | Williams | |
| 6,895,974 B2 | 5/2005 | Peele | |
| 6,906,172 B2 | 6/2005 | Bratcher et al. | |
| 6,953,040 B2 | 10/2005 | Atchley et al. | |
| 7,014,039 B2 | 3/2006 | Henson et al. | |
| 7,025,066 B2 | 4/2006 | Lawson et al. | |
| 7,032,601 B2 | 4/2006 | Atchley et al. | |
| 7,034,128 B2 | 4/2006 | Turpen et al. | |
| 7,048,211 B2 | 5/2006 | Bratcher et al. | |
| 7,173,170 B2 | 2/2007 | Liu et al. | |
| 7,208,659 B2 | 4/2007 | Colliver et al. | |
| 7,230,160 B2 | 6/2007 | Benning et al. | |
| 7,337,782 B2 | 3/2008 | Thompson | |
| D592,956 S | 5/2009 | Thiellier | |
| 7,537,110 B2 | 5/2009 | Kutsch et al. | |
| D594,154 S | 6/2009 | Patel et al. | |
| 7,584,843 B2 | 9/2009 | Kutsch et al. | |
| 7,650,892 B1 | 1/2010 | Groves et al. | |
| 7,694,686 B2 | 4/2010 | Atchley et al. | |
| 2004/0020503 A1 | 2/2004 | Williams | |
| 2005/0115580 A1 | 6/2005 | Quinter et al. | |
| 2005/0244521 A1* | 11/2005 | Strickland | A23L 1/2205 424/751 |
| 2006/0037623 A1 | 2/2006 | Lawrence, Jr. | |
| 2006/0191548 A1 | 8/2006 | Strickland et al. | |
| 2006/0236434 A1 | 10/2006 | Conkling et al. | |
| 2007/0062549 A1 | 3/2007 | Holton, Jr. et al. | |
| 2007/0186941 A1 | 8/2007 | Holton, Jr. et al. | |
| 2007/0186942 A1 | 8/2007 | Strickland et al. | |
| 2008/0029110 A1 | 2/2008 | Dube et al. | |
| 2008/0029116 A1 | 2/2008 | Robinson et al. | |
| 2008/0029117 A1 | 2/2008 | Mua et al. | |
| 2008/0173317 A1 | 7/2008 | Robinson et al. | |
| 2008/0196730 A1 | 8/2008 | Engstrom et al. | |
| 2008/0209586 A1 | 8/2008 | Nielsen et al. | |
| 2008/0245377 A1 | 10/2008 | Marshall et al. | |
| 2008/0305216 A1 | 12/2008 | Crawford et al. | |
| 2009/0004248 A1 | 1/2009 | Bunick et al. | |
| 2009/0014018 A1 | 1/2009 | Sengupta et al. | |
| 2009/0014343 A1 | 1/2009 | Clark et al. | |
| 2009/0014450 A1 | 1/2009 | Bjorkholm | |
| 2009/0025738 A1 | 1/2009 | Mua et al. | |
| 2009/0025739 A1 | 1/2009 | Brinkley et al. | |
| 2009/0065013 A1 | 3/2009 | Essen et al. | |
| 2009/0223989 A1 | 9/2009 | Gelardi | |
| 2009/0230003 A1 | 9/2009 | Thiellier | |
| 2009/0250360 A1 | 10/2009 | Bellamah et al. | |
| 2009/0266837 A1 | 10/2009 | Gelardi et al. | |
| 2009/0293889 A1 | 12/2009 | Kumar et al. | |
| 2010/0084424 A1 | 4/2010 | Gelardi | |
| 2010/0124560 A1 | 5/2010 | Hugerth et al. | |
| 2010/0133140 A1 | 6/2010 | Bailey et al. | |
| 2010/0275936 A1 | 11/2010 | Bivehed | |
| 2010/0291245 A1 | 11/2010 | Gao et al. | |
| 2010/0300464 A1 | 12/2010 | Gee et al. | |
| 2010/0303969 A1 | 12/2010 | Sengupta et al. | |
| 2011/0139164 A1 | 6/2011 | Mua et al. | |
| 2011/0220130 A1* | 9/2011 | Mua et al. | 131/111 |

FOREIGN PATENT DOCUMENTS

| | | |
|---|---|---|
| WO | WO 2005/023226 | 3/2005 |
| WO | WO 2006/114604 | 11/2006 |
| WO | WO 2008/103935 A2 | 8/2008 |
| WO | WO 2008/112124 | 9/2008 |
| WO | WO 2008/140372 | 11/2008 |
| WO | WO 2010/132444 A2 | 11/2010 |
| WO | WO 2011/081725 | 7/2011 |

OTHER PUBLICATIONS

Nestor, et al. "Role of Oxides of Nitrogen in Tobacco-Specific Nitrosamine Formation in Flue-Cured Tobacco", Beitrage zur Tabakforschung International/Contributions to Tobacco Research, Nov. 2003, pp. 467-475, vol. 20 No. 7.

Staaf et al. "Formation of Tobacco-Specific Nitrosamines (TSNA) During Air-Curing: Conditions and Control", Beitrage zur Tabakforschung International/Contributions to Tobacco Research Jul. 2005, pp. 321-330, vol. 21 No. 6.

Matheson "The Chemical Structure of Amylose and Amylopectin Fractions of Starch From Tobacco Leaves During Development and Diurnally—Nocturnally," *Carbohydrate Research*, 1996, pp. 247-262, vol. 282.

Latimer, Pyrolysis, 1966, p. 1325.

\* cited by examiner

SMOKELESS TOBACCO PASTILLE AND MOULDING PROCESS FOR FORMING SMOKELESS TOBACCO PRODUCTS

FIELD OF THE DISCLOSURE

The present disclosure relates to products made or derived from tobacco, or that otherwise incorporate tobacco, and are intended for human consumption. In particular, the disclosure relates to compositions or formulations incorporating tobacco, and that are intended to be employed in a smokeless form.

BACKGROUND OF THE DISCLOSURE

Cigarettes, cigars, and pipes are popular smoking articles that employ tobacco in various forms. Such smoking articles are employed by heating or burning tobacco to generate aerosol (e.g., smoke) that may be inhaled by the smoker. Tobacco may also be enjoyed in a so-called "smokeless" form. Particularly popular smokeless tobacco products are employed by inserting some form of processed tobacco or tobacco-containing formulation into the mouth of the user. See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; US Pat. Pub. Nos. 2004/0020503 to Williams; 2005/0115580 to Quinter et al.; 2005/0244521 to Strickland et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0029117 to Mua et al.; 2008/0173317 to Robinson et al.; 2008/0196730 to Engstrom et al.; 2008/0209586 to Neilsen et al.; 2008/0305216 to Crawford et al.; 2009/0065013 to Essen et al.; 2009/0293889 to Kumar et al.; and 2010/0291245 to Gao et al.; PCT WO 04/095959 to Arnarp et al.; and WO 2010/132444 A2 to Atchley; and U.S. patent application Ser. No. 12/638,394, filed Dec. 15, 2009, to Mua et al.; each of which is incorporated herein by reference. Exemplary smokeless tobacco products that have been marketed include those referred to as CAMEL Snus, CAMEL Orbs, CAMEL Strips and CAMEL Sticks by R. J. Reynolds Tobacco Company; GRIZZLY moist tobacco, KODIAK moist tobacco, LEVI GARRETT loose tobacco and TAYLOR'S PRIDE loose tobacco by American Snuff Company, LLC; KAYAK moist snuff and CHATTANOOGA CHEW chewing tobacco by Swisher International, Inc.; REDMAN chewing tobacco by Pinkerton Tobacco Co. LP; COPENHAGEN moist tobacco, COPENHAGEN Pouches, SKOAL Bandits, SKOAL Pouches, RED SEAL long cut and REVEL Mint Tobacco Packs by U.S. Smokeless Tobacco Company; and MARLBORO Snus and Taboka by Philip Morris USA.

It would be desirable to provide an enjoyable form of a tobacco product, such as a smokeless tobacco product, and to provide processes for preparing tobacco-containing compositions suitable for use in smokeless tobacco products.

SUMMARY OF THE DISCLOSURE

The present disclosure relates to a dissolvable smokeless tobacco pastille product configured for insertion into the mouth of a user and processes for preparing a smokeless tobacco composition suitable for use in a smokeless tobacco product. The smokeless tobacco composition of the disclosure provides a dissolvable smokeless tobacco product having a lightly chewable quality. In one embodiment, the smokeless tobacco product is in the form of a solid object having a tobacco material (e.g., particulate tobacco), a sugar alcohol, and a natural gum binder component. The smokeless tobacco composition can include a sugar alcohol, a natural gum binder component, and granular or particulate particles of tobacco, and may include other ingredients, such as sweeteners, additional binders, emulsifiers, additional fillers, flavoring agents, buffering agents, humectants, and disintegration aids. According to one aspect, the tobacco material includes particulate tobacco having tobacco particles with an average particle size of less than about 100 microns, and preferably less than about 50 microns, and preferably an average particle size of about 25 microns.

In one aspect, the disclosure provides a smokeless tobacco pastille product configured for insertion into the mouth of a user of the product, the smokeless tobacco pastille product comprising a tobacco material, a sugar alcohol, and a natural gum binder component. A suitable sugar alcohol for providing a smokeless tobacco pastille product in accordance with the present disclosure includes erythritol, arabitol, ribitol, isomalt, maltitol, dulcitol, iditol, mannitol, xylitol, lactitol, sorbitol, and combinations thereof. A suitable natural gum binder component for providing a smokeless tobacco pastille product in accordance with the present disclosure includes gum arabic, xanthan gum, guar gum, ghatti gum, gum tragacanth, karaya gum, locust bean gum, gellan gum, and combinations thereof.

The smokeless tobacco composition can further include one or more additives, such as flavorants, sweeteners, additional fillers, additional binders, emulsifiers, humectants, syrups, disintegration aids, buffering agents, and mixtures thereof. Certain embodiments of the invention include additional binders (e.g., tobacco-derived starch), humectants (e.g., corn syrup, glycerin), natural sweeteners (e.g., sucrose), artificial sweeteners (e.g., sucralose), flavorants, salts (e.g., sodium chloride), buffering agents (e.g., sodium hydroxide) and combinations thereof.

In certain embodiments, the smokeless tobacco composition further includes an outer coating, such as an outer coating comprising a film-forming polymer, such as a cellulosic polymer, and an optional plasticizer. Other optional coating ingredients include flavorants, sweeteners, colorants, and salts.

In yet another aspect, the invention provides a process for preparing a smokeless tobacco composition pastille configured for insertion into the mouth of a user. The process includes providing an aqueous mixture comprising a hydrated natural gum binder component, mixing a tobacco material with the aqueous mixture to form a smokeless tobacco mixture, heating the smokeless tobacco mixture (e.g., to at least about 40° C.), depositing the heated smokeless tobacco mixture into a mould, and curing the mixture to form the smokeless tobacco composition pastille. Optionally, the method can further include applying an outer coating to the smokeless tobacco composition pastille.

If desired, the process can further include mixing a tobacco-derived binder component with the aqueous mixture. The aqueous mixture can be formed by hydrating the natural gum binder component (e.g., a water soluble gum such as gum arabic) using a sugar alcohol (e.g., sorbitol) solution or suspension. The heating step can involve heating the smokeless tobacco mixture to at least about 40° C. The smokeless tobacco mixture can be maintained at an elevated temperature (e.g., at least about 40° C.) following deposition into the mould. The method can also include cooling the smokeless tobacco composition pastille at ambient temperature. Additional ingredients can be added to the tobacco material prior to the mixing step, such as ingredients selected from the group consisting of flavorants, sweeteners, emulsifiers, disintegration aids, humectants, buffering agents, and mixtures thereof.

Aspects of the present disclosure thus provide advantages as otherwise detailed herein.

DETAILED DESCRIPTION

The present disclosure now will be described more fully hereinafter. The disclosure may be embodied in many different forms and should not be construed as limited to the aspects set forth herein; rather, these aspects are provided so that this disclosure will satisfy applicable legal requirements. As used in this specification and the claims, the singular forms "a," "an," and "the" include plural referents unless the context clearly dictates otherwise.

The disclosure provides a smokeless tobacco composition suitable for oral use. The smokeless tobacco composition generally includes a tobacco material formulation and one or more additional components that combine to form a dissolvable and lightly chewable smokeless tobacco pastille product for oral use. As used herein, the term "pastille" refers to a dissolvable oral product made by solidifying a liquid or gel composition, such as a composition that includes a gelling or binding agent, so that the final product is a hardened solid gel. As used herein, the terms "dissolve," "dissolving," and "dissolvable" refer to compositions having aqueous-soluble components that interact with moisture in the oral cavity and enter into solution, thereby causing gradual consumption of the product. In certain embodiments, the products of the disclosure are characterized by sufficient cohesiveness to withstand light chewing action in the oral cavity without rapidly disintegrating. The products of the disclosure typically do not exhibit a highly deformable chewing quality as found in conventional chewing gum.

The smokeless tobacco pastilles of the disclosure typically include at least one tobacco material (e.g., a particulate tobacco material), at least one binder or gelling agent in the form of a natural gum, and a sugar alcohol as a filler component.

In certain embodiments, in addition to the natural gum component, at least a portion of the binder component utilized in the smokeless tobacco compositions of the disclosure is a tobacco-derived binder. The tobacco-derived binder includes a tobacco-derived starch material which typically comprises one or more polysaccharides containing multiple monosaccharide units. In particular, the tobacco-derived starch is a polymer containing a plurality of glucose molecules connected by hydrolysable alpha linkages (i.e., alpha-1,4-glucosidic linkages). The number average molecular weight of the starch component of the binder can vary, but is typically about 1,000 Da to about 20,000 Da, more often about 2,000 Da to about 10,000 Da. The use of a binder containing tobacco-derived starch material is advantageous because such materials represent a natural product providing useful adhesive properties that enhance product cohesiveness, and also provides compatibility with the other sources of tobacco in the product from an organoleptic standpoint.

In one embodiment, the tobacco-derived binder is a starch-enriched tobacco extract that contains tobacco-derived starch as the predominant ingredient, and which may contain other tobacco-derived components such as dietary fiber, protein, moisture, ash, and other sugar components. The relative amounts of the components forming the tobacco-derived binder may vary. A typical range of the tobacco-derived starch component within the tobacco-derived binder is about 40 to about 60 dry weight percent, and more typically about 45 to about 55 dry weight percent, based on the total weight of the tobacco-derived binder. In certain embodiments, the tobacco-derived starch component of the binder can be characterized as present in an amount of at least about 35 dry weight percent, often at least about 40 dry weight percent, more often at least about 45 dry weight percent, and most often at least about 50 dry weight percent. A typical range of the dietary fiber component within the tobacco-derived binder is about 10 to about 20 dry weight percent. A typical range of the protein component within the tobacco-derived binder is about 5 to about 15 dry weight percent. A typical range of the ash component within the tobacco-derived binder is about 10 to about 15 dry weight percent. A typical range of the sugar component (other than the starch component) within the tobacco-derived binder is about 1 to about 3 dry weight percent.

The tobacco-derived starch material can be extracted from tobacco plant material, including any of the types of tobacco discussed herein, including flue-cured tobacco, burley tobacco, Oriental tobacco, and the like. The portion of the tobacco plant subjected to extraction can be the whole plant or any sub-part of the plant, including the leaf, stem, root, seed, or flower. In addition, the tobacco subjected to the extraction process can be in various forms discussed herein, including mature, cured, or green forms. In one embodiment, the tobacco-derived starch material may be extracted according to the following process. The tobacco plant material may be subjected to a combined grinding and extraction process that subjects the tobacco plant material to a grinding action and simultaneously contacts the plant material with an extraction solvent, typically at a ratio of about 0.5 L extraction solvent/1 kg biomass or higher. An exemplary extraction solvent may include a buffer solution such as, for example, a solution of about 20 mM Sodium Phosphate, about 500 mM NaCl, and about 0.125% Sodium Metabisulfite, pH 7.2. The grinding/extraction step produces a liquid extract and a solid pulp containing primarily fiber and pectin. The liquid extract from the initial extraction step may be centrifuged to further separate the liquid extract into a soluble liquid fraction and a solids fraction using, for example, a decanter centrifuge (e.g., Alpha Laval NX-409) or any other suitable centrifuge system, such as, for example, a basket type centrifuge system or a batch type centrifuge system, wherein the feed rate into the centrifuge can be between about 10 to about 20 L/min, typically about 15 L/min, and the solids content in the feed stream to the centrifuge is about 3 percent to about 6 percent solids. The soluble liquid fraction produced in this step contains primarily soluble proteins and sugars, which can be recovered if desired through further processing. The solids fraction produced by the centrifugation step contains the desired starch as well as other components noted above as part of the tobacco-derived binder. In some instances, the centrifuge system may operate in the range of about 1000 rpm to about 6000 rpm, and typically in the range of about 4600 rpm to about 5200 rpm. The recovered solids fraction is in the form of a slurry or a paste. The slurry may be dried using, for example, an industrial oven (e.g., an oven operated at a temperature of about 60° C. to about 70° C.), a vortex dryer, flash drying technology, spray drying or any other suitable drying process. The dried material is then ground, milled or otherwise pulverized into a powder or granular form to form a tobacco-derived binder capable of being used as an ingredient in some embodiments of the present disclosure. The tobacco-derived binder is typically employed in the form of parts or pieces that have an average particle size less than about 500 microns, and more preferably less than about 100 microns, and even more preferably less than about 50 microns, while, in some instances, the tobacco-derived binder may have an average particle size in the range of between about 1 micron and about 10 microns.

The relative amount of tobacco-derived binder within the smokeless tobacco composition may vary. Preferably, the amount of tobacco-derived binder within the smokeless tobacco composition is at least about 0.5 percent or at least about 1 percent or at least about 1.5 percent, on a dry weight basis of the composition. An exemplary weight range is about 0.5 to about 10 weight percent, more often about 1 to about 5 weight percent.

The moisture content of the tobacco-derived binder prior to mixing with the tobacco material formulation may vary. Most preferably, the moisture content of the tobacco-derived binder is less than about 15 weight percent, and may be less than about 5 percent.

In some instances, the tobacco-derived binder may be subjected to a wash process to remove or otherwise limit any negative taste effects the tobacco-derived binder would contribute to the finished pastille product. According to one exemplary procedure, the tobacco-derived binder material can be placed in an Erlenmeyer flask or other suitable vessel. A 95 percent ethanol solution or similar alcohol solution can be poured into the flask and then the mixture shaken. The mixture can be heated at an elevated temperature, typically to a boil (e.g., at about 52° C. or higher), for a period of time (e.g., about 10 minutes or more). The heated mixture may be stirred to ensure even heating thereof. The heated mixture is filtered using a filter system (e.g., Buckner funnel filter, vacuum hose, vacuum line, and flask). The washed solids are filtered and collected in the Buckner funnel filter. The filtered solids are then subjected to a second wash procedure if desired (repeat wash procedure). After the second wash, the filtered solids are typically transported to a glass drying dish and placed under a hood for drying for about 16 to 24 hours. The dried tobacco-derived binder material may then be irradiated if desired.

The products of the disclosure incorporate some form of a plant of the *Nicotiana* species, and most preferably, those compositions or products incorporate some form of tobacco (in addition to the optional tobacco-derived binder). The selection of the *Nicotiana* species can vary; and in particular, the selection of the types of tobacco or tobaccos may vary. Tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and Rustica tobaccos, as well as various other rare or specialty tobaccos. Descriptions of various types of tobaccos, growing practices and harvesting practices are set forth in *Tobacco Production, Chemistry and Technology*, Davis et al. (Eds.) (1999), which is incorporated herein by reference. Various representative other types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al. and U.S. Pat. No. 7,025,066 to Lawson et al.; US Patent Appl. Pub. Nos. 2006/0037623 to Lawrence, Jr. and 2008/0245377 to Marshall et al.; each of which is incorporated herein by reference. Exemplary *Nicotiana* species include *N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N. x sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis* subsp. *Hersperis, N. pauciflora, N. petunioides, N. quadrivalvis, N. repanda, N. rotundifolia, N. solanifolia,* and *N. spegazzinii.*

*Nicotiana* species can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; US Patent Appl. Pub. No. 2006/0236434 to Conkling et al.; and PCT WO 2008/103935 to Nielsen et al.

For the preparation of smokeless and smokable tobacco products, it is typical for a harvested plant of the *Nicotiana* species to be subjected to a curing process. Descriptions of various types of curing processes for various types of tobaccos are set forth in *Tobacco Production, Chemistry and Technology*, Davis et al. (Eds.) (1999). Exemplary techniques and conditions for curing flue-cured tobacco are set forth in Nestor et al., *Beitrage Tabakforsch. Int.*, 20, 467-475 (2003) and U.S. Pat. No. 6,895,974 to Peele, which are incorporated herein by reference. Representative techniques and conditions for air curing tobacco are set forth in U.S. Pat. No. 7,650,892 to Groves et al.; Roton et al., *Beitrage Tabakforsch. Int.*, 21, 305-320 (2005) and Staaf et al., *Beitrage Tabakforsch. Int.*, 21, 321-330 (2005), which are incorporated herein by reference. Certain types of tobaccos can be subjected to alternative types of curing processes, such as fire curing or sun curing. Preferably, harvested tobaccos that are cured are then aged. As such, tobaccos used for the preparation of tobacco compositions or products most preferably incorporate components of tobaccos that have been cured and aged. Tobacco materials used in the present invention can be subjected to additional processing prior to use, such as fermentation, bleaching, and the like.

At least a portion of the plant of the *Nicotiana* species (e.g., at least a portion of the tobacco portion) can be employed in an immature form. That is, the plant, or at least one portion of that plant, can be harvested before reaching a stage normally regarded as ripe or mature. As such, for example, tobacco can be harvested when the tobacco plant is at the point of a sprout, is commencing leaf formation, is commencing flowering, or the like.

At least a portion of the plant of the *Nicotiana* species (e.g., at least a portion of the tobacco portion) can be employed in a mature form. That is, the plant, or at least one portion of that plant, can be harvested when that plant (or plant portion) reaches a point that is traditionally viewed as being ripe, over-ripe or mature. As such, for example, through the use of tobacco harvesting techniques conventionally employed by farmers, Oriental tobacco plants can be harvested, burley tobacco plants can be harvested, or Virginia tobacco leaves can be harvested or primed by stalk position.

After harvest, the plant of the *Nicotiana* species, or portion thereof, can be used in a green form (e.g., tobacco can be used without being subjected to any curing process). For example, tobacco in green form can be frozen, subjected to irradiation, yellowed, dried, cooked (e.g., roasted, fried or boiled), or otherwise subjected to storage or treatment for later use. Such tobacco also can be subjected to aging conditions.

The tobacco material may be cased and dried, and then ground to the desired form. For example, in some instances, the tobacco material formulation may be cased with an aqueous casing containing components such as sugars (e.g., fructose, glucose, and sucrose), humectants (e.g., glycerin and propylene glycol), flavoring ingredients (e.g., cocoa and licorice), and the like. Non-aqueous casing components may be applied to the tobacco in amounts of about 1 percent to about 15 percent, based on the dry weight of the tobacco.

The tobacco material is typically used in a form that can be described as particulate (i.e., shredded, ground, granulated, or powder form). The manner by which the tobacco material is provided in a finely divided or powder type of form may vary. Preferably, plant parts or pieces are comminuted, ground or pulverized into a particulate form using equipment and techniques for grinding, milling, or the like. Most preferably, the plant material is relatively dry in form during grinding or milling, using equipment such as hammer mills, cutter heads, air control mills, or the like. For example, tobacco parts or pieces may be ground or milled when the moisture content thereof is less than about 15 weight percent or less than about 5 weight percent. Most preferably, the tobacco material is employed in the form of parts or pieces that have an average particle size less than about 50 microns. In one embodiment, the average particle size of the tobacco particles may be less than or equal to about 25 microns. In some instances, the tobacco particles may be sized to pass through a screen mesh. If desired, air classification equipment may be used to ensure that small sized tobacco particles of the desired sizes, or range of sizes, may be collected. If desired, differently sized pieces of granulated tobacco may be mixed together.

At least a portion of the tobacco material employed in the tobacco composition or product can have the form of an extract. Tobacco extracts can be obtained by extracting tobacco using a solvent having an aqueous character such as distilled water or tap water. As such, aqueous tobacco extracts can be provided by extracting tobacco with water, such that water insoluble pulp material is separated from the aqueous solvent and the water soluble and dispersible tobacco components dissolved and dispersed therein. The tobacco extract can be employed in a variety of forms. For example, the aqueous tobacco extract can be isolated in an essentially solvent free form, such as can be obtained as a result of the use of a spray drying or freeze drying process, or other similar types of processing steps. Alternatively, the aqueous tobacco extract can be employed in a liquid form, and as such, the content of tobacco solubles within the liquid solvent can be controlled by selection of the amount of solvent employed for extraction, concentration of the liquid tobacco extract by removal of solvent, addition of solvent to dilute the liquid tobacco extract, or the like. Exemplary techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,284,875 to Turpen et al.; U.S. Pat. No. 6,298,859 to Kierulff et al.; U.S. Pat. No. 6,772,767 to Mua et al.; U.S. Pat. No. 6,817,970 to Berit et al.; U.S. Pat. No. 6,906,172 to Bratcher et al.; U.S. Pat. No. 7,034,128 to Turpen et al.; U.S. Pat. No. 7,048,211 to Bratcher et al.; and U.S. Pat. No. 7,337,782 to Thompson, all of which are incorporated by reference herein.

The relative amount of tobacco material within the smokeless tobacco composition may vary, but tobacco material is typically the predominate ingredient. Preferably, the amount of tobacco material formulation within the smokeless tobacco composition is at least about 25 percent or at least about 30 percent, on a dry weight basis of the composition, and including all sources of tobacco including any tobacco-derived components such as binders. In certain instances, the amounts of other components within the smokeless tobacco composition may exceed about 40 percent, on a dry weight basis. A typical range of tobacco material formulation within the smokeless tobacco composition is about 25 to about 60 dry weight percent, more typically about 30 to about 40 dry weight percent.

The moisture content of the tobacco material formulation prior to mixing with any liquid substances to form the smokeless tobacco composition may vary. Most preferably, the moisture content of the tobacco material formulation is less than about 10 weight percent, and may be less than about 5 percent, and is often less than about 2.5 weight percent. The manner by which the moisture content of the tobacco material formulation is controlled may vary. For example the tobacco material formulation may be subjected to thermal or convection heating. As a specific example, the tobacco material formulation may be oven-dried, in warmed air at temperatures of about 40° C. to about 95° C. for a length of time appropriate to attain the desired moisture content. For example, the tobacco material formulation may be dried for about 12 hours to about 24 hours at about 54° C. to about 60° C.

In some instances, prior to preparation of the tobacco material formulation, the tobacco parts or pieces may be irradiated, or those parts and pieces may be pasteurized, or otherwise subjected to controlled heat treatment. Additionally, if desired, after preparation of all or a portion of the tobacco material formulation, the component materials may be irradiated, or those component materials may be pasteurized, or otherwise subjected to controlled heat treatment. For example, a tobacco material formulation may be prepared, followed by irradiation or pasteurization, and then flavoring ingredient(s) may be applied to the formulation. Representative processes are set forth in US Pat. Pub. Nos. 2009/0025738 to Mua et al. and 2009/0025739 to Brinkley et al.; and U.S. application Ser. No. 12/756,656 to Beeson et al., filed Apr. 8, 2010, which are incorporated herein by reference.

The tobacco material formulation used for the manufacture of the smokeless tobacco product also can be processed, blended, formulated, combined and mixed with other materials or ingredients (i.e., additives). See, for example, those representative components, combination of components, relative amounts of those components and ingredients relative to tobacco, and manners and methods for employing those components, set forth in US Pat. Pub. Nos. 2007/0062549 to Holton, et al. and 2007/0186941 to Holton, et al., each of which is incorporated herein by reference.

The additives can be artificial, or can be obtained or derived from herbal or biological sources. Exemplary types of additives include salts (e.g., sodium chloride, potassium chloride, sodium citrate, potassium citrate, sodium acetate, potassium acetate, flour salt, and the like), natural sweeteners (e.g., fructose, sucrose, glucose, maltose, vanillin, ethylvanillin glucoside, mannose, galactose, lactose, stevia, and the like), artificial sweeteners (e.g., sucralose, sucrose, isomaltulose, saccharin, aspartame, acesulfame K, neotame and the like), organic and inorganic fillers (e.g., grains, processed grains, puffed grains, maltodextrin, dextrose, calcium carbonate, calcium phosphate, corn starch, lactose, sugar alcohols such as isomalt, maltitol, mannitol, xylitol, or sorbitol, finely divided cellulose, and the like), binders (e.g., povidone, sodium carboxymethylcellulose and other modified cellulosic types of binders, sodium alginate, xanthan gum, starch-based binders, gum arabic, gellan gum, lecithin, polydextrose, and the like), gelling agents (e.g., fish gelatin), pH adjusters or buffering agents (e.g., metal hydroxides, preferably alkali metal hydroxides such as sodium hydroxide and potassium hydroxide, and other alkali metal buffers such as metal carbonates, preferably potassium carbonate or sodium carbonate, or metal bicarbonates such as sodium bicarbonate, and the like), emulsifiers, colorants (e.g., dyes and pigments, including caramel coloring, titanium dioxide, and the like), humectants (e.g., glycerin, propylene glycol, and the like), oral care additives (e.g., thyme oil, eucalyptus oil, and zinc), preservatives (e.g., potassium sorbate and the like), syrups (e.g., honey, high fructose corn syrup, corn syrup, and the like), disintegration or compressibility aids (e.g., microcrystalline cellulose, croscarmellose sodium, crospovidone, sodium starch glycolate, pregelatinized corn starch, and the like), flavorant and flavoring mixtures, antioxidants, and mixtures thereof. Exemplary types of additives may include those described in, for example, U.S. Pat. Pub. No. 2010/0291245 to Gao et al., previously incorporated by reference herein.

Such additives may be provided in a powder or granulated form for mixing with the tobacco material formulation, or otherwise may be provided in liquid form. Most preferably, the additive when provided in a powder or granulated form is employed in the form of parts or pieces that have an average particle size less than about 50 microns. According to some aspects, the average particle size of the additive may be about 25 microns or less. The moisture content of the additives provided in a powder or granulated form may vary. Most preferably, the moisture content of the additive provided in a powder or granulated form is less than about 10 weight percent, and may be less than about 5 percent, and is often less than about 2.5 weight percent. The additive may be admixed with any component or with the particulate tobacco material in, for example, a Hobart mixer with a paddle prior to adding any liquid additives. In the event liquid additives are provided, the resultant mixture may still have a relatively low moisture content of less than about 10 weight percent, and may be less than about 5 percent, and is often less than about 2.5 weight percent. The relative amounts of the various additive components within the smokeless tobacco product may vary.

The aforementioned types of additives can be employed together (e.g., as additive formulations) or separately (e.g., individual additive components can be added at different stages involved in the preparation of the final tobacco product). The relative amounts of the various components within the smokeless tobacco formulation may vary, and typically are selected so as to provide the desired sensory and performance characteristics to the tobacco product. Furthermore, the aforementioned types of additives may be encapsulated as provided in the final product or composition. Exemplary encapsulated additives are described, for example, in WO 2010/132444 A2 to Atchley, which has been previously incorporated by reference herein.

Any of the above-noted classes of additives for the smokeless tobacco composition of the disclosure can be derived from tobacco material by subjecting at least a portion of a tobacco plant (e.g., leaves, seeds, flowers, stalks, roots, or stems) to a separation process, which typically can include multiple sequential extraction steps, in order to isolate desired components of the tobacco material. Exemplary separation processes include chromatography, distillation, filtration, recrystallization, solvent-solvent partitioning, cold pressing, solvent extraction (e.g., using solvents such as water, alcohols or hydrocarbons such as heptane or hexane), or a combination thereof. The resulting isolated tobacco component can be chemically transformed prior to use in the compositions of the disclosure. Exemplary chemical transformations include hydrogenation, esterification, transesterification, isomeric conversion, acetal formation, acetal decomposition, acid/base reaction, hydrolysis, thermal treatment, enzymatic treatment, and combinations of such steps. Techniques for preparing tobacco isolates for use in the compositions of the disclosure are set forth, for example, in U.S. application Ser. No. 12/688,294 to Coleman, III et al., filed Jan. 15, 2010, and U.S. application Ser. No. 12/764,613 to Coleman, III et al., filed Apr. 21, 2010, which are incorporated by reference herein in their entirety. Examples of the types of compounds that may be present in the tobacco isolate include hydrocarbons, cellulose, alcohols, aldehydes, ketones, carboxylic acids, amino acids, esters, lactones, anhydrides, carbohydrates (e.g., reducing sugars), phenols, quinones, ethers, nitriles, amines, amides, imides, plastid pigments, proteins, coenzyme-Q, pectin, starch, lignin, and lipids. Additional examples are described as natural tar diluents in PCT WO 2007/012980 to Lipowicz, which is incorporated by reference herein in its entirety. The type or function of a smokeless tobacco additive prepared from a tobacco isolate will vary depending on the composition of the isolate, which can vary in part based on the extraction process employed, the portion of the tobacco plant involved, the type of chemical transformation utilized, and the like. Certain tobacco isolates can provide sugars, fillers, binders, disintegration or compressibility aids, or flavorants for the smokeless tobacco composition of the disclosure.

As used herein, a "flavorant" or "flavoring agent" is any flavorful or aromatic substance capable of altering the sensory characteristics associated with the smokeless tobacco composition. Exemplary sensory characteristics that can be modified by the flavorant include, taste, mouthfeel, moistness, coolness/heat, and/or fragrance/aroma. The flavorants can be natural or synthetic, and the character of these flavors can be described as, without limitation, fresh, sweet, herbal, confectionary, floral, fruity or spice. Specific types of flavors include, but are not limited to, vanilla, coffee, chocolate, cream, mint (e.g., mint oil), spearmint, menthol, peppermint, wintergreen, lavender, cardamon, nutmeg, cinnamon, clove, cascarilla, sandalwood, honey, jasmine, ginger, anise, sage, licorice, lemon, orange, apple, peach, lime, cherry, and strawberry. Flavorants utilized in the disclosure also can include components that are considered moistening, cooling or smoothening agents, such as eucalyptus. These flavors may be provided neat (i.e., alone) or in a composite (e.g., spearmint and menthol or orange and cinnamon). In some instances, the flavorant may be provided in a spray-dried form or a liquid form. Flavorants are typically present in an amount of about 0.5 to about 10 dry weight percent, often about 1 to about 6 dry weight percent, and most often about 2 to about 5 dry weight percent.

Sweeteners can be used in natural or artificial form or as a combination of artificial and natural sweeteners. In one embodiment, sucrose and sucralose are primary sweetener ingredients. When present, a representative amount of sweetener, whether an artificial sweetener and/or natural sugar, may make up at least about 0.2 percent or at least about 5 percent, of the total dry weight of the composition. Preferably, the amount of sweetener within the composition will not exceed about 40 percent, often will not exceed about 35 percent, and frequently will not exceed about 30 percent, of the total dry weight of the composition. Sucrose is particularly advantageous in certain embodiments as an ingredient as it is believed to contribute to the chewing resistance or "bounce" of the final product. In addition, while granulated sucrose provides far less sweetening effect as compared to sucralose, the presence of sucrose can be advantageous as an additional filler component. When these two sweeteners are present together, the sucralose is typically present in an amount of at least about 0.25 dry weight percent, often at least about 0.5 dry weight percent, and most often at least about 1.0 dry weight percent (e.g., about 0.25 to about 2.0 dry weight percent), and the sucrose is typically present in an amount of at least about 2.0 dry weight percent, often at least about 3.0 dry weight percent, and most often at least about 4.0 dry weight percent (e.g., about 1.0 to about 6.0 dry weight percent).

A syrup preferably may be employed in amounts sufficient to provide chewiness and retard solubilization, or otherwise provide desired flavor attributes to the smokeless tobacco composition. When present, a representative amount of syrup (e.g., corn syrup) may make up less than about 10 percent of the total dry weight of the composition.

The smokeless tobacco compositions of the disclosure typically includes at least one filler ingredient. Sugar alcohols are particularly advantageous as filler components in the pastilles of the disclosure because such materials contribute some sweetness and do not disrupt the desired chewable characteristics of the final product. Sugar alcohols are polyols derived from monosaccharides or disaccharides that have a partially or fully hydrogenated form. Exemplary sugar alcohols have between about 4 and about 20 carbon atoms and include erythritol, arabitol, ribitol, isomalt, maltitol, dulcitol, iditol, mannitol, xylitol, lactitol, sorbitol, and combinations thereof (e.g., hydrogenated starch hydrolysates). A sugar alcohol is typically added to compositions of the disclosure in the form of an aqueous solution or suspension, such as a solution or suspension with a solids content of about 50 to about 90 weight percent. Combinations of a sugar alcohol with a further filler component can also be used. A filler component often fulfills multiple functions, such as enhancing certain organoleptic properties such as texture and mouthfeel, enhancing cohesiveness or compressibility of the product, and the like. When present, a representative amount of filler, whether an organic and/or inorganic filler, may make up at least about 10 percent, at least about 20 percent, or at least about 25 percent, based on the total dry weight of the composition. Preferably, the amount of filler within the composition will not exceed about 50 percent, and frequently will not exceed about 40 percent, of the total dry weight of the composition. A typical filler range is about 15 dry weight percent to about 40 dry weight percent.

A salt (e.g., sodium chloride, flour salt) may be employed in amounts sufficient to provide desired sensory attributes to the smokeless tobacco composition. When present, a representative amount of salt is at least about 0.5 dry weight percent or at least about 1.0 dry weight percent or at least about 1.5 dry weight percent, but will typically may make up less than about 5 percent of the total dry weight of the composition (e.g., about 0.5 to about 4 dry weight percent).

A humectant (e.g., glycerin) may be employed in amounts sufficient to provide desired moisture attributes to the smokeless tobacco composition. Further, in some instances, the humectant may impart desirable flow characteristics to the smokeless tobacco composition for depositing in a starch mould. When present, a representative amount of humectant is at least about 0.5 dry weight percent or at least about 1.0 dry weight percent or at least about 1.5 dry weight percent, but will typically make up less than about 5 percent of the total dry weight of the composition (e.g., about 0.5 to about 4 dry weight percent).

A binder (or combination of binders) may be employed in amounts sufficient to provide the desired physical attributes and physical integrity to the smokeless tobacco composition. A representative amount of binder may make up at least about 5 percent or at least about 10 percent of the total dry weight of the composition. In certain embodiments, the binder component(s) of the composition will be present in an amount of at least about 15 dry weight percent or at least about 20 dry weight percent or at least about 25 dry weight percent. Preferably, the total amount of binder within the composition will not exceed about 45 percent of the total dry weight of the composition. Often, the amount of binder within a desirable composition will not exceed about 40 percent, and frequently will not exceed about 35 percent, of the total dry weight of the composition. As noted previously, the binder can include a tobacco-derived material in some embodiments, which can be combined with one or more additional binder components. In certain embodiments, the binder material includes a natural gum. As used herein, a natural gum refers to polysaccharide materials of natural origin that are useful as thickening or gelling agents. When present, natural gum binder materials are typically present in an amount of at least about 15 dry weight percent or at least about 20 dry weight percent or at least about 25 dry weight percent. Representative natural gums derived from plants, which are typically water soluble to some degree, include xanthan gum, guar gum, gum arabic, ghatti gum, gum tragacanth, karaya gum, locust bean gum, gellan gum, and combinations thereof. In one particular embodiment, the binder composition comprises gum arabic in combination with a tobacco-derived binder as described herein.

Preferred buffering agents buffer within a pH range of about 6 to about 10, and exemplary buffering agents include metal hydroxides, metal carbonates, metal bicarbonates, or mixtures thereof. The buffering agent is typically present in an amount less than about 1 percent based on the dry weight of the formulation.

Representative smokeless tobacco compositions may incorporate about 25 to about 35 percent tobacco, about 0.1 to about 2 percent artificial sweetener, about 1 to about 5 percent humectant, about 1 to about 5 percent natural sweetener, about 20 to about 30 percent sugar alcohol filler, about 10 to about 30 percent binder, flavoring ingredient in an amount of up to about 5 percent, and salt in an amount up to about 3 percent, based on the total dry weight of the smokeless tobacco composition. The particular percentages and choice of ingredients will vary depending upon the desired flavor, texture, and other characteristics.

The manner by which the various components of the smokeless tobacco composition are combined may vary. The various components of the smokeless tobacco composition may be contacted, combined, or mixed together in conical-type blenders, mixing drums, ribbon blenders, or the like, such as a Hobart mixer. As such, the overall mixture of various components with the powdered tobacco components may be relatively uniform in nature. See also, for example, the types of methodologies set forth in U.S. Pat. No. 4,148,325 to Solomon et al.; U.S. Pat. No. 6,510,855 to Korte et al.; and U.S. Pat. No. 6,834,654 to Williams, each of which is incorporated herein by reference.

The ingredients forming the dissolvable smokeless tobacco composition are prepared such that the mixture thereof may be used in a starch moulding process for forming the smokeless tobacco product. Exemplary pastille production processes are set forth in U.S. Pat. No. 4,725,440 to Ridgway et al and U.S. Pat. No. 6,077,524 to Bolder et al., which are incorporated by reference herein.

In one embodiment, the process comprises providing an aqueous mixture for mixing with dry ingredients. In some instances, the aqueous mixture may be formed by hydrating a binder material with water and/or a sugar alcohol solution or suspension, and then admixing the hydrated binder with a sweetener and/or other liquid or dissolvable additives, such as, for example, a syrup, using a high shear mixer or a Hobart mixing bowl with a whipping attachment. In other instances, the aqueous mixture may be formed by adding water to a sugar alcohol solution and then dispersing a binder material (e.g., a water soluble gum) into the water and sugar alcohol solution mixture using a high shear mixer or a Hobart mixing bowl with a whipping attachment. A sweetener or other liquid or dissolvable additives may then be admixed with the water, sugar alcohol solution, and binder material. In any event, the aqueous mixture typically has a moisture content of at least about 30 percent by weight water, based on the total weight of the mixture (e.g., in the form of a slurry).

The aqueous mixture is mixed with a tobacco material (e.g., a particulate tobacco material) and any other dry additives in a Hobart mixing bowl to form a smokeless tobacco composition in slurry form. When present, the tobacco-derived binder may be mixed with the aqueous mixture and the particulate tobacco material. The smokeless tobacco composition may then be heated to an elevated temperature for a period of time, for example, heated to between about 40° C. to about 80° C., and typically heated to about 60° C., for a period of about 1 to about 3 minutes. The heating step can be characterized as heating at a temperature of at least about 40° C. or at least about 50° C. The smokeless tobacco composition typically has a moisture content of at least about 40 percent by weight water, based on the total weight of the mixture.

According to some aspects, the smokeless tobacco composition, in the form of a slurry, may be put through a deaerating step or process prior to being received in a mould or being subjected to other processing steps, so as to reduce or eliminate air bubbles present in the slurry mixture. Air bubbles entrapped within the slurry may affect the final weight of the smokeless tobacco product, which could lead to a lack of weight uniformity between units of the final smokeless tobacco product. As such, any deaerating methods and systems may be employed for removing such air bubbles from the slurry material. For example, the slurry may be placed under reduced pressure (i.e., below atmospheric pressure) to pull the air bubbles out of the slurry mixture. In some instances, a vacuum deaerating process may be employed in which the slurry mixture is placed in a vacuum deaerator for deaerating the slurry mixture using pressure reduction. In some instances, the slurry mixture may be under vacuum for about 1 to about 10 minutes, and typically for about 3 to about 5 minutes. The deaerating step may be observed and adjusted accordingly in order to controllably remove the gaseous components from the slurry mixture.

The viscosity of the heated and deaerated slurry mixture may be measured using, for example, a Brookfield viscometer HA Series, SC4 water jacket, 27/13R sample chamber and a No. 27 spindle. The smokeless tobacco composition may have a viscosity of about 5.7 Pascal-seconds (Pa·s) to about 6.2 Pa·s when heated to a temperature of about 38° C., about 4.9 Pa·s to about 5.4 Pa·s when heated to a temperature of about 43° C., and about 4.2 Pa·s to about 4.7 Pa·s when heated to a temperature of about 50° C. In some instances, extra water may be added to the smokeless tobacco composition so as to provide a desired viscosity thereof.

One the desired viscosity is achieved, the heated smokeless tobacco composition may then be deposited into a mould, such as, for example, a starch mould. While the process as further described herein is directed to forming a smokeless tobacco product using a starch mould, it is noted that other types of moulds may be used in the process, such as, for example, starchless moulds, plastic tray moulds, metallic tray moulds, neoprene tray moulds, etc.

In instances involving the use of starch moulds, the starch moulds may be pre-dried to remove moisture content from the starch mould itself. That is, prior to receiving the slurry or viscous smokeless tobacco composition, the starch mould may be subjected to an elevated temperature to drive out moisture in the starch mould. For example, in some instances, the starch mould may initially have a moisture content of about 10-15 weight percent. Such levels of moisture could potentially have an affect on the uniformity of the resultant product. In this regard, certain moisture levels in the starch mould could potentially have a wrinkling or pruning effect on the product such that the final product has a shriveled or otherwise wrinkled appearance. As such, the starch mould may be dried at an elevated temperature to reduce the moisture content of the starch mould to between about 4 and about 10 weight percent, and preferably between about 6 and about 8 weight percent, based on the total weight of the starch mould. By taking such steps, the product may, in some instances, be more uniformly consistent in appearance. Furthermore, the starch mould may be heated to an elevated temperature prior to receiving the smokeless tobacco composition such that the starch mould itself is at an elevated temperature when receiving the smokeless tobacco composition.

The smokeless tobacco composition remains in the starch mould at an elevated temperature such as, for example, at between about 40° C. to about 80° C. (e.g., at least about 40° C. or at least about 50° C.), and typically at about 60° C. The smokeless tobacco composition may be held at the elevated temperature for a predetermined duration of time such as, for example, about 15-25 hours, so as to allow the smokeless tobacco composition to cure and solidify into pastille form, while driving the moisture content of the smokeless tobacco composition to a desired final moisture level. In this regard, curing generally refers to the solidification process in which moisture loss occurs, the viscosity of the composition is raised, and chemical and physical changes begin to occur (e.g., crystallization, cross-linking, gelling, film forming, etc.). The smokeless tobacco composition is allowed to cool and thereafter removed from the starch mould. In some instances, the smokeless tobacco composition may be allowed to cool at refrigerated or below ambient temperatures. An air blower/shaker device can be used to remove starch remnants from the smokeless tobacco composition after being removed from the starch mould.

The smokeless tobacco composition is then allowed to post-cure for a time and at a temperature suitable to allow the composition to become equilibrated to a desired moisture, shape and form. The time and temperature can vary without departing from the invention and depend in part on the desired final characteristics of the product. In one embodiment, the post-cure is conducted at ambient temperature for at least about 20 hours after being removed from the mould. The resultant pastille product may be provided in individual pieces weighing between about 0.5 grams to about 5 grams, although aspects of the present disclosure are not limited to such weights.

The curing times and temperatures of the smokeless tobacco composition can be varied as desired. In this regard, such variables may affect the final visual appearance of the smokeless tobacco product. For example, extended curing times and/or low curing temperatures may affect the final outer configuration or contours of the smokeless tobacco product. That is, the rate of drying and/or curing of the product can affect the final properties of the product. In some instances, for example, lowering the curing temperature and extending the curing time may cause the smokeless tobacco product to have a relatively smooth outer surface. In contrast, curing at higher temperatures for shorter period of times can lead to a roughened or wrinkled appearance in the product.

According to other aspects of the present disclosure, rather than using moulds to prepare the smokeless tobacco product, an extrusion process may be employed in which the final smokeless tobacco product is extruded. In some instances, the smokeless tobacco composition in slurry form may be formed into a sheet and allowed to dry to a moisture content, for example, of about 15 percent to about 25 percent by weight water to form a tacky or otherwise pasty material, which is in a form capable of physical handling. The material may then be chopped or otherwise cut into smaller pieces using, for example, a mixer. The chopped material may then be extruded through an extrusion device to any shape/size desired, including shapes that may be difficult or impossible to achieve with a mould. In some instances, the extruded product may then be dried to achieve a desired moisture content. A similar type process is described, for example, in U.S. Pat. No. 3,806,617 to Smylie et al., which is incorporated herein by reference in its entirety. Further, the smokeless tobacco composition may be subjected to a co-extrusion process with another composition, which may be a smokeless tobacco composition or any other non-smokeless tobacco composition.

Shapes such as, for example, rods and cubes can be formed by first extruding the material through a die having the desired cross-section (e.g., round or square) and then optionally cutting the extruded material into desired lengths. Techniques and equipment for extruding tobacco materials are set forth in U.S. Pat. No. 3,098,492 to Wursburg; U.S. Pat. No. 4,874,000 to Tamol et al.; U.S. Pat. No. 4,880,018 to Graves et al.; U.S. Pat. No. 4,989,620 to Keritsis et al.; U.S. Pat. No. 5,072,744 to Luke et al.; U.S. Pat. No. 5,829,453 to White et al.; and U.S. Pat. No. 6,182,670 to White et al.; each of which is incorporated herein by reference. Exemplary extrusion equipment suitable for use include food or gum extruders, or industrial pasta extruders such as Model TP 200/300 available from Emiliomiti, LLC of Italy. In some instances, a single machine may be capable of achieving multiple steps of the processes described herein, such as, for example, kneader systems available from Buss AG.

The smokeless tobacco pastille product can be dried or moistened to reach the final desired moisture level. The moisture content of the smokeless tobacco product prior to use by a consumer can vary. Typically, the moisture content of the smokeless tobacco product, as present within a single unit of product prior to insertion into the mouth of the user, is within the range of about 5 to about 20 weight percent, often about 8 to about 15 weight percent, more often about 10 to about 13 weight percent, based on the total weight of the product unit.

The acidity or alkalinity of the smokeless tobacco product, which is often characterized in terms of pH, can vary. Typically, the pH of that formulation is at least about 6.5, and preferably at least about 7.5. Typically, the pH of that formulation will not exceed about 9.5, and often will not exceed about 9.0. A representative tobacco formulation exhibits a pH of about 6.8 to about 8.8 (e.g., about 7.4 to about 8.2). A representative technique for determining the pH of a smokeless tobacco formulation involves dispersing 5 g of that formulation in 100 ml of high performance liquid chromatography water, and measuring the pH of the resulting suspension/solution (e.g., with a pH meter).

The dissolvable smokeless tobacco pastille product can be provided in any suitable predetermined shape or form, and most preferably is provided in the form having a general shape of a pill, pellet, tablet, coin, bead, ovoid, obloid, cube, or the like. The mouthfeel of the smokeless tobacco product preferably has a slightly chewable and dissolvable quality with a mild resilience or "bounce" upon chewing that gradually leads to greater malleability during use. According to one aspect, the dissolvable smokeless tobacco pastille product is preferably capable of lasting in the user's mouth for about 10-15 minutes until it completely dissolves. Preferably, the products do not, to any substantial degree, leave any residue in the mouth of the user thereof, and do not impart a slick, waxy, or slimy sensation to the mouth of the user.

According to some embodiments, the smokeless tobacco composition may be coated with a coating substance after being removed from the starch mould and prior to drying. For example, a glazing or anti-sticking coating substance, such as, for example, CAPOL 410 (available from Centerchem, Inc.), may be applied to the smokeless tobacco composition to provide free-flowing properties. Outer coatings can also help to improve storage stability of the smokeless tobacco products of the present disclosure as well as improve the packaging process by reducing friability and dusting. Devices for providing outer coating layers to the products of the present disclosure include pan coaters and spray coaters, and particularly include the coating devices available as CompuLab 24, CompuLab 36, Accela-Cota 48 and Accela-Cota 60 from Thomas Engineering.

An exemplary outer coating comprises a film-forming polymer, such as a cellulosic polymer, an optional plasticizer, and optional flavorants, colorants, salts, sweeteners or other additives of the types set forth herein. The coating compositions are usually aqueous in nature and can be applied using any pellet or tablet coating technique known in the art, such as pan coating. Exemplary film-forming polymers include cellulosic polymers such as methylcellulose, hydroxypropyl cellulose (HPC), hydroxypropyl methylcellulose (HPMC), hydroxyethyl cellulose, and carboxy methylcellulose. Exemplary plasticizers include aqueous solutions or emulsions of glyceryl monostearate and triethyl citrate.

In one embodiment, the coating composition comprises up to about 75 weight percent of a film-forming polymer solution (e.g., about 40 to about 70 weight percent based on total weight of the coating formulation), up to about 5 weight percent of a plasticizer (e.g., about 0.5 to about 2 weight percent), up to about 5 weight percent of a sweetener (e.g., about 0.5 to about 2 weight percent), up to about 10 weight percent of one or more colorants (e.g., about 1 to about 5 weight percent), up to about 5 weight percent of one or more flavorants (e.g., about 0.5 to about 3 weight percent), up to about 2 weight percent of a salt such as NaCl (e.g., about 0.1 to about 1 weight percent), and the balance water. Exemplary coating compositions and methods of application are described in U.S. application Ser. No. 12/876,785 to Hunt et al.; filed Sep. 7, 2010, and which is incorporated by reference herein.

Although the foregoing description focuses on compositions that are uniform throughout each product unit, products can also be formed with multiple different formulations having different properties in the same product unit. For example, two different compositions can be deposited in a single mold to product a layered product. Still further, two different compositions could be co-extruded to form a product with different characteristics across its cross-section. Such a process could be used to provide a product with two different compositions featuring different dissolution rates such that a first portion of the product dissolves at a first rate (e.g., a faster rate) and a second portion dissolves at a second, slower rate.

According to some aspects, the tobacco particulate component of the pastille composition may be replaced with other suitable botanical particulate components such as, for example, tea particulates, coffee particulates, herbal particulates, spice particulates and/or combinations thereof. The particulates may be typically provided in a powder form, which may be extracted from an appropriate botanical source.

Products of the present disclosure may be packaged and stored in any suitable packaging. See, for example, the various types of containers for smokeless types of products that are set forth in U.S. Pat. No. 7,014,039 to Henson et al.; U.S. Pat. No. 7,537,110 to Kutsch et al.; U.S. Pat. No. 7,584,843 to Kutsch et al.; D592,956 to Thiellier and D594, 154 to Patel et al.; US Pat. Pub. Nos. 2008/0173317 to Robinson et al.; 2009/0014343 to Clark et al.; 2009/0014450 to Bjorkholm; 2009/0250360 to Bellamah et al.; 2009/0266837 to Gelardi et al.; 2009/0223989 to Gelardi; 2009/0230003 to Thiellier; 2010/0084424 to Gelardi; and 2010/0133140 to Bailey et al; and U.S. patent application Ser. No. 29/342,212, filed Aug. 20, 2009, to Bailey et al.; Ser. No. 12/425,180, filed Apr. 16, 2009, to Bailey et al.; Ser. No. 12/685,819, filed Jan. 12, 2010, to Bailey et al.; and Ser. No. 12/814,015, filed Jun. 11, 2010, to Gelardi et al., which are incorporated herein by reference.

EXPERIMENTAL

The following examples are provided to illustrate further aspects associated with the present disclosure, but should not be construed as limiting the scope thereof. Unless otherwise noted, all parts and percentages are by dry weight.

Example 1

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a sweetener (granulated sugar), a syrup (corn syrup), and a flavorant (mint oil) using a high shear mixer. The aqueous mixture is about 33 parts binder material, 29 parts sweetener, 4.1 parts syrup, 0.9 parts flavorant, and 33 parts water.

The aqueous mixture is mixed with a tobacco material, a sweetener (sucralose) and a flavorant in a Hobart mixing bowl to form a smokeless tobacco composition. The mixture of the smokeless tobacco composition is about 69 parts aqueous mixture, 30 parts tobacco material, 0.5 parts sucralose, and 0.4 parts flavorant.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 2

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a sweetener (granulated sugar) and a syrup (corn syrup) using a high shear mixer. The aqueous mixture is about 33 parts binder material, 29 parts sweetener, 4.2 parts syrup, and 33 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 58 parts aqueous mixture, 25 parts tobacco material, 0.4 parts sucralose, 0.3 parts flavorant, and 17 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 3

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a sweetener (granulated sugar), a syrup (corn syrup), and a salt using a high shear mixer. The aqueous mixture is about 33 parts binder material, 29 parts sweetener, 4.1 parts syrup, 2 parts salt, and 33 parts water.

The aqueous mixture is mixed with a sweetener (sucralose), a flavorant and a tobacco material in a Hobart mixing bowl to form a smokeless tobacco composition. The mixture of the smokeless tobacco composition is about 74 parts aqueous mixture, 25 parts tobacco material, 0.5 parts sucralose, and 0.4 parts flavorant.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 4

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (isomalt), an additional filler (maltitol; available as LYCASIN from Roquette Frères S.A.), and a salt using a high shear mixer. The aqueous mixture is about 33 parts binder material, 29 parts isomalt, 4.1 parts maltitol, 2 parts salt, and 33 parts water.

The aqueous mixture is mixed with a sweetener (sucralose) and a tobacco material in a Hobart mixing bowl to form a smokeless tobacco composition. The mixture of the smokeless tobacco composition is about 74.5 parts aqueous mixture, 25 parts tobacco material, and 0.5 parts sucralose.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 5

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a sweetener (granulated sugar), a salt, and a syrup (corn syrup) using a high shear mixer. The aqueous mixture is about 33 parts binder material, 28 parts sweetener, 3 parts salt, 4.1 parts syrup, and 33 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1.3 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 6

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a sweetener (granulated sugar), a salt, and a syrup (corn syrup) using a high shear mixer. The aqueous mixture is about 33 parts binder material, 28 parts sweetener, 3 parts salt, 4 parts syrup, and 33 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1 part flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 7

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (isomalt), an additional filler (maltitol; available as LYCASIN from Roquette Frères S.A.), and a salt using a high shear mixer. The aqueous mixture is about 33 parts binder material, 4.1 parts isomalt, 29 parts maltitol, 2 parts salt, and 33 parts water.

The aqueous mixture is mixed with a sweetener (sucralose) and a tobacco material in a Hobart mixing bowl to form a smokeless tobacco composition. The mixture of the smokeless tobacco composition is about 74.5 parts aqueous mixture, 25 parts tobacco material, and 0.5 parts sucralose.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould.

The smokeless tobacco composition is then cured at ambient room temperature for about 24 hours.

Example 8

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (maltitol; available as LYCASIN from Roquette Frères S.A.) and a salt using a high shear mixer. The aqueous mixture is about 30 parts binder material, 38 parts filler, 2.7 parts salt, and 30 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1 part flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 9

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then dispersing a binder material (gum arabic) into the water and sorbitol 70 solution mixture using a high shear mixer. The aqueous mixture is about 42 parts binder material, 42 parts sorbitol 70 solution, and 16 parts water.

The aqueous mixture is mixed with a sweetener (sucralose), a flavorant, flour salt, water, and a tobacco material in a Hobart mixing bowl to form a smokeless tobacco composition. The mixture of the smokeless tobacco composition is about 61 parts aqueous mixture, 20 parts tobacco material, 0.2 parts sucralose, 1.8 parts flour salt, 0.9 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 10

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (xylitol), an additional filler (maltitol; available as LYCASIN from Roquette Frères S.A.) and a salt using a high shear mixer. The aqueous mixture is about 33 parts binder material, 28 parts xylitol, 4.1 parts maltitol, 3 parts salt, and 33 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1 part flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 11

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (xylitol), an additional filler (maltitol; available as LYCASIN from Roquette Frères S.A.), a salt, and a humectant (glycerin) using a high shear mixer. The aqueous mixture is about 32 parts binder material, 27 parts xylitol, 3.9 parts maltitol, 2.9 parts salt, 3.3 parts humectant, and 32 parts water.

The aqueous mixture is mixed with a sweetener (sucralose), a flavorant, flour salt, water, and a tobacco material in a Hobart mixing bowl to form a smokeless tobacco composition. The mixture of the smokeless tobacco composition is about 61 parts aqueous mixture, 20 parts tobacco material, 0.2 parts sucralose, 0.9 parts flavorant, 1.8 parts flour salt, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 12

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (granulated maltitol), a salt, and a syrup (corn syrup) using a high shear mixer. The aqueous mixture is about 33 parts binder material, 28 parts filler, 3 parts salt, 4.1 parts syrup, and 33 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1.3 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 13

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (isomaltulose; available as PALATINOSE from BENEO, Inc.), a salt, and a syrup (corn syrup) using a high shear mixer. The aqueous mixture is about 33 parts binder material, 28 parts filler, 3 parts salt, 4.1 parts syrup, and 33 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1.3 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 14

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (granulated maltitol), a syrup (corn syrup), a salt, and a humectant (glycerin) using a high shear mixer. The aqueous mixture is about 32 parts binder material, 27 parts maltitol, 3.9 parts syrup, 2.9 parts salt, 3.3 parts humectant, and 32 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1.3 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 15

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (isomaltulose; available as PALATINOSE from BENEO, Inc.), a salt, a syrup (corn syrup), and a humectant (glycerin) using a high shear mixer. The aqueous mixture is about 32 parts binder material, 27 parts filler, 2.9 parts salt, 3.9 parts syrup, 3.3 parts humectant, and 32 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1.3 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 16

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (granulated maltitol), a syrup (corn syrup), a salt, and a humectant (glycerin) using a high shear mixer. The aqueous mixture is about 31 parts binder material, 26 parts maltitol, 3.8 parts syrup, 2.8 parts salt, 6.4 parts humectant, and 31 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1.3 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 17

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a sweetener (granulated sugar), a syrup (corn syrup), and a salt using a high shear mixer. The aqueous mixture is about 33 parts binder material, 28 parts sweetener, 4.1 parts syrup, 3 parts salt, and 33 parts water.

The aqueous mixture is mixed with a sweetener (sucralose), a flavorant, water, and a tobacco material blend of two types of tobacco material in a Hobart mixing bowl to form a smokeless tobacco composition. The mixture of the smokeless tobacco composition is about 62 parts aqueous mixture, 21 parts tobacco material, 0.2 parts sucralose, 0.6 parts flavorant, and 17 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 18

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (granulated maltitol), a syrup (corn syrup), a salt, and a sweetener (sugar) using a high shear mixer. The aqueous mixture is about 33 parts binder material, 22 parts maltitol, 4.1 parts syrup, 3 parts salt, 5.2 parts sweetener, and 33 parts water.

The aqueous mixture is mixed with a sweetener (sucralose), a flavorant, water, and a tobacco material blend of two types of tobacco material in a Hobart mixing bowl to form a smokeless tobacco composition. The mixture of the smokeless tobacco composition is about 62 parts aqueous mixture, 21 parts tobacco material, 0.2 parts sucralose, 0.6 parts flavorant, and 17 parts water.

The smokeless tobacco composition is heated to about 54° C. and then deposited into a starch mould. The smokeless tobacco composition remains in the starch mould for about 40 hours at about 54° C. The smokeless tobacco composition is allowed to cool and then removed from the starch mould. The smokeless tobacco composition is then cured at ambient room temperature for about 24 hours.

Example 19

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a filler (granulated maltitol), a syrup (corn syrup), a salt, and a sweetener (sugar) using a high shear mixer. The aqueous mixture is about 33 parts binder material, 17 parts maltitol, 4.1 parts syrup, 3 parts salt, 10 parts sweetener, and 33 parts water.

The aqueous mixture is mixed with a sweetener (sucralose), a flavorant, water, and a tobacco material blend of two types of tobacco material in a Hobart mixing bowl to form a smokeless tobacco composition. The mixture of the smokeless tobacco composition is about 62 parts aqueous mixture, 21 parts tobacco material, 0.2 parts sucralose, 0.6 parts flavorant, and 17 parts water.

The smokeless tobacco composition is heated to about 54° C. and then deposited into a starch mould. The smokeless tobacco composition remains in the starch mould for about 40 hours at about 54° C. The smokeless tobacco composition is allowed to cool and then removed from the starch mould. The smokeless tobacco composition is then cured at ambient room temperature for about 24 hours.

Example 20

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. The aqueous mixture is about 42 parts binder material, 42 parts sorbitol 70 solution, and 16 parts water.

The aqueous mixture is mixed with a sweetener (sucralose), a flavorant, flour salt, water, and a tobacco material in a Hobart mixing bowl to form a smokeless tobacco composition. The mixture of the smokeless tobacco composition is about 61 parts aqueous mixture, 20 parts tobacco material, 0.2 parts sucralose, 1.8 parts flour salt, 0.9 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 21

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. The aqueous mixture is about 37 parts binder material, 49 parts sorbitol 70 solution, and 14 parts water.

The aqueous mixture is mixed with a sweetener (sucralose), a flavorant, flour salt, water, and a tobacco material blend of two types of tobacco material in a Hobart mixing bowl to form a smokeless tobacco composition. The mixture of the smokeless tobacco composition is about 59 parts aqueous mixture, 22 parts tobacco material, 0.2 parts sucralose, 1.8 parts flour salt, 0.7 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 22

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a sweetener (granulated sugar), a syrup (corn syrup), and a salt using a high shear mixer. The aqueous mixture is about 33 parts binder material, 28 parts sweetener, 4.1 parts syrup, 3 parts salt, and 33 parts water.

The aqueous mixture is mixed with a tobacco material, a sweetener (sucralose), a flavorant, and water in a Hobart mixing bowl to form a smokeless tobacco composition. The mixture of the smokeless tobacco composition is about 62 parts aqueous mixture, 21 parts tobacco material, 0.5 parts sucralose, 1.1 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 23

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a sweetener (granulated sugar), a syrup (corn syrup), and a salt using a high shear mixer. The aqueous mixture is about 33 parts binder material, 28 parts sweetener, 4.1 parts syrup, 3 parts salt, and 33 parts water.

The aqueous mixture is mixed with a sweetener (sucralose), a flavorant, water, and a tobacco material blend of two types of tobacco material in a Hobart mixing bowl to form a smokeless tobacco composition. The mixture of the smokeless tobacco composition is about 62 parts aqueous mixture, 21 parts tobacco material, 0.2 parts sucralose, 0.7 parts flavorant, and 17 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 24

A smokeless tobacco composition suitable for use as a smokeless tobacco product for oral use is provided in the following manner.

An aqueous mixture is prepared. The aqueous mixture is formed by hydrating a binder material (gum arabic) with water and then admixing the hydrated gum with a sweetener (granulated sugar), a syrup (corn syrup), and a salt using a high shear mixer. The aqueous mixture is about 33 parts binder material, 28 parts sweetener, 4.1 parts syrup, 3 parts salt, and 33 parts water.

The aqueous mixture is mixed with a sweetener (sucralose), a flavorant, water, and a tobacco material blend of two types of tobacco material in a Hobart mixing bowl to form a smokeless tobacco composition. The mixture of the smokeless tobacco composition is about 62 parts aqueous mixture, 20 parts tobacco material, 0.2 parts sucralose, 1.3 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 25

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. The aqueous mixture is about 37 parts binder material, 49 parts sorbitol 70 solution, and 14 parts water.

The aqueous mixture is mixed with a sweetener (sucralose), a flavorant, flour salt, a humectant (glycerin), water, and a tobacco material blend of two types of tobacco material in a Hobart mixing bowl to form a smokeless tobacco composition. The mixture of the smokeless tobacco composition is about 57 parts aqueous mixture, 21 parts tobacco material, 0.2 parts sucralose, 1.7 parts flour salt, 3.1 parts humectant, 0.7 parts flavorant, and 15 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 26

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. A sweetener (granulated sugar) is admixed with the water, sorbitol 70 solution, and binder material and allowed to dissolve therein. The aqueous mixture is about 40 parts binder material, 35 parts sorbitol 70 solution, 10 parts sweetener, and 14 parts water.

The aqueous mixture is mixed with a sweetener (sucralose), a flavorant, flour salt, water, and a tobacco material blend of two types of tobacco material in a Hobart mixing bowl to form a smokeless tobacco composition. The mixture of the smokeless tobacco composition is about 59 parts aqueous mixture, 22 parts tobacco material, 0.2 parts sucralose, 1.8 parts flour salt, 0.8 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 27

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. A sweetener (granulated sugar) is admixed with the water, sorbitol 70 solution, and binder material and allowed to dissolve therein. The aqueous mixture is about 40 parts binder material, 35 parts sorbitol 70 solution, 10 parts sweetener, and 14 parts water.

The aqueous mixture is mixed with a sweetener (sucralose), a flavorant, flour salt, a humectant (glycerin), water, and a tobacco material blend of two types of tobacco material in a Hobart mixing bowl to form a smokeless tobacco composition. The mixture of the smokeless tobacco composition is about 57 parts aqueous mixture, 21 parts tobacco material, 0.2 parts sucralose, 1.7 parts flour salt, 3.1 parts humectant, 0.7 parts flavorant, and 15 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 28

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. A sweetener (granulated sugar) is admixed with the water, sorbitol 70 solution, and binder material and allowed to dissolve therein. The aqueous mixture is about 40 parts binder material, 41 parts sorbitol 70 solution, 5 parts sweetener, and 14 parts water.

The aqueous mixture is mixed with a sweetener (sucralose), a flavorant, flour salt, a humectant (glycerin), water, and a tobacco material blend of two types of tobacco material in a Hobart mixing bowl to form a smokeless tobacco composition. The mixture of the smokeless tobacco composition is about 57 parts aqueous mixture, 21 parts tobacco material, 0.2 parts sucralose, 1.7 parts flour salt, 3.1 parts humectant, 0.7 parts flavorant, and 15 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 29

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. A sweetener (granulated sugar) is admixed with the water, sorbitol 70 solution, and binder material and allowed to dissolve therein. The aqueous mixture is about 40 parts binder material, 41 parts sorbitol 70 solution, 5 parts sweetener, and 14 parts water.

The aqueous mixture is mixed with a sweetener (sucralose), a flavorant, flour salt, water, and a tobacco material blend of two types of tobacco material in a Hobart mixing bowl to form a smokeless tobacco composition. The mixture of the smokeless tobacco composition is about 58 parts aqueous mixture, 22 parts tobacco material, 0.2 parts sucralose, 1.7 parts flour salt, 0.7 parts flavorant, and 17 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 30

A smokeless tobacco composition suitable for use as a smokeless tobacco product for oral use is provided in the following manner.

An aqueous mixture is prepared. The aqueous mixture is formed by admixing a binder material (polydextrose), water, a sweetener (granulated sugar), a syrup (corn syrup), and a salt using a high shear mixer. The aqueous mixture is about 33 parts binder material, 28 parts sweetener, 4.1 parts syrup, 3 parts salt, and 33 parts water.

The aqueous mixture is mixed with a sweetener (sucralose), a flavorant, water, and a tobacco material in a Hobart mixing bowl to form a smokeless tobacco composition. The mixture of the smokeless tobacco composition is about 62 parts aqueous mixture, 21 parts tobacco material, 0.2 parts sucralose, 1.1 parts flavorant, and 16 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 31

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) into the water and sorbitol 70 solution mixture using a high shear mixer. A sweetener (granulated sugar) is admixed with the water, sorbitol 70 solution, and binder material and allowed to dissolve therein. The aqueous mixture is about 40 parts binder material, 41 parts sorbitol 70 solution, 5 parts sweetener, and 14 parts water.

The aqueous mixture is mixed with a sweetener (sucralose), a flavorant, flour salt, water, and a tobacco material blend of two types of tobacco material in a Hobart mixing bowl to form a smokeless tobacco composition. The mixture of the smokeless tobacco composition is about 57 parts aqueous mixture, 21 parts tobacco material, 0.2 parts sucralose, 1.7 parts flour salt, 0.7 parts flavorant, and 19 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 32

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. A sweetener (granulated sugar) is admixed with the water, sorbitol 70 solution, and binder material and allowed to dissolve therein. The aqueous mixture is about 40 parts binder material, 41 parts sorbitol 70 solution, 5 parts sweetener, and 14 parts water.

The aqueous mixture is mixed with a sweetener (sucralose), a flavorant, a salt, water, and a tobacco material blend of two types of tobacco material in a Hobart mixing bowl to form a smokeless tobacco composition. The mixture of the smokeless tobacco composition is about 57 parts aqueous mixture, 21 parts tobacco material, 0.2 parts sucralose, 1.7 parts salt, 0.7 parts flavorant, and 19 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 33

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. A sweetener (granulated sugar) is admixed with the water, sorbitol 70 solution, and binder material and allowed to dissolve therein. The aqueous mixture is about 40 parts binder material, 41 parts sorbitol 70 solution, 5 parts sweetener, and 14 parts water.

The aqueous mixture is mixed with a sweetener (sucralose), a flavorant, a salt, water, and a tobacco material blend of two types of tobacco material in a Hobart mixing bowl to form a smokeless tobacco composition. The mixture of the smokeless tobacco composition is about 57 parts aqueous mixture, 22 parts tobacco material, 0.2 parts sucralose, 1.7 parts salt, 0.5 parts flavorant, and 19 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 34

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. A sweetener (granulated sugar) is admixed with the water, sorbitol 70 solution, and binder material and allowed to dissolve therein. The aqueous mixture is about 40 parts binder material, 41 parts sorbitol 70 solution, 5 parts sweetener, and 14 parts water.

The aqueous mixture is mixed with a sweetener (sucralose), a flavorant, a salt, a buffering agent (sodium hydroxide), water, a tobacco material blend of two types of tobacco material, and a tobacco-derived starch material in a Hobart mixing bowl to form a smokeless tobacco composition. The mixture of the smokeless tobacco composition is about 53 parts aqueous mixture, 22 parts tobacco material, 1.8 parts tobacco-derived starch component, 0.7 parts sucralose, 1.6 parts salt, 0.2 parts buffering agent, 2.7 parts flavorant, and 18 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Example 35

A smokeless tobacco composition suitable for use as a smokeless tobacco product for oral use is provided in the following manner.

An aqueous mixture is prepared. The aqueous mixture is formed by adding water to a sorbitol 70 solution (available from Roquette Frères S. A.) and then hydrating a binder material (gum arabic) with the water and sorbitol 70 solution mixture using a high shear mixer. A sweetener (granulated sucrose) and a buffering agent (sodium hydroxide) are admixed with the water, sorbitol 70 solution, and binder material and allowed to dissolve therein. The aqueous mixture is about 27 parts binder material, 29 parts sorbitol 70 solution, 5.2 parts sweetener, 0.2 parts buffering agent, and 40 parts water.

The aqueous mixture is mixed with a sweetener (sucralose), a flavorant, a salt, a humectant (glycerin), water, a tobacco material blend of two types of tobacco material, and a tobacco-derived starch component in a Hobart mixing bowl to form a smokeless tobacco composition. The mixture of the smokeless tobacco composition is about 54 parts aqueous mixture, 16 parts tobacco material, 1.3 parts tobacco-derived starch component, 0.5 parts sucralose, 1.1 parts salt, 1.1 parts humectant, 2 parts flavorant, and 24 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A smokeless tobacco composition configured for insertion into the mouth of a user, the smokeless tobacco composition comprising a tobacco material, a sugar alcohol, and a natural gum binder component, wherein the tobacco material is a particulate tobacco material having an average particle size of less than about 50 microns, wherein the sugar alcohol is present in an amount of at least about 25% by weight of the composition and wherein the natural gum binder component is present in an amount of at least about 25% by weight of the composition, the composition being in the form of a pastille;
   wherein the smokeless tobacco composition comprising:
   at least about 25 dry weight percent of tobacco material, based on the total weight of the composition;
   at least about 0.5 dry weight percent of tobacco-derived binder component;
   at least about 0.5 dry weight percent of at least one humectant;
   at least about 0.2 dry weight percent of at least one sweetener; and
   at least about 0.5 dry weight percent of at least one flavorant.

2. The smokeless tobacco composition of claim 1, wherein the tobacco-derived binder component comprises a tobacco-derived starch material.

3. The smokeless tobacco composition of claim 2, wherein the tobacco-derived binder component comprises at least about 50 percent starch on a dry weight basis.

4. The smokeless tobacco composition of claim 2 wherein the smokeless tobacco composition comprises about 1 weight percent to about 5 weight percent of the tobacco-derived binder component on a dry weight basis.

5. The smokeless tobacco composition of claim 1, wherein the sugar alcohol comprises sorbitol.

6. The smokeless tobacco composition of claim 1, wherein the sugar alcohol is selected from the group consisting of erythritol, arabitol, ribitol, isomalt, maltitol, dulcitol, iditol, mannitol, xylitol, lactitol, sorbitol, and combinations thereof.

7. The smokeless tobacco composition of claim 1, wherein the natural gum binder component is gum arabic.

8. The smokeless tobacco composition of claim 1, wherein the natural gum binder component is selected from the group consisting of gum arabic, xanthan gum, guar gum, ghatti gum, gum tragacanth, karaya gum, locust bean gum, gellan gum, and combinations thereof.

9. The smokeless tobacco composition of claim 1, further comprising an additive selected from the group consisting of flavorants, sweeteners, additional binders, emulsifiers, disintegration aids, humectants, buffering agents, and mixtures thereof.

10. The smokeless tobacco composition of claim 9, wherein the humectant is glycerin.

11. The smokeless tobacco composition of claim 9, wherein the sweetener comprises sucralose, sucrose, or a combinations thereof.

12. The smokeless tobacco composition of claim 9, wherein the sweetener comprises granulated sugar.

13. The smokeless tobacco composition of claim 1, wherein the pastille has an outer coating coated thereon.

14. The smokeless tobacco composition of claim 1, comprising:
   at least about 30 dry weight percent of tobacco material, based on the total weight of the composition;
   at least about 2 dry weight percent of tobacco-derived binder component;
   at least about 2 dry weight percent of at least one humectant;
   at least about 1 dry weight percent of at least one sweetener; and
   at least about 4 dry weight percent of at least one flavorant.

* * * * *